US006307241B1

(12) United States Patent
Awschalom et al.

(10) Patent No.: US 6,307,241 B1
(45) Date of Patent: *Oct. 23, 2001

(54) INTEGRABLE FERROMAGNETS FOR HIGH DENSITY STORAGE

(75) Inventors: David D. Awschalom; Pierre M. Petroff, both of Santa Barbara; Jing Shi, Goleta; James M. Kikkawa, Santa Barbara, all of CA (US)

(73) Assignee: The Regents of the Unversity of California, Oakland, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/475,235

(22) Filed: Jun. 7, 1995

(51) Int. Cl.$^7$ .................................................. H01L 29/82

(52) U.S. Cl. .......................... 257/421; 257/425; 257/431

(58) Field of Search .................................. 257/421–427, 257/431; 428/546; 427/526

(56) References Cited

U.S. PATENT DOCUMENTS

| | | | | |
|---|---|---|---|---|
| 3,792,452 | * | 2/1974 | Dixon et al. .......................... | 427/526 |
| 5,107,460 | * | 4/1992 | Matthews .............................. | 365/122 |
| 5,191,223 | * | 3/1993 | Munekata ............................. | 257/421 |
| 5,462,809 | * | 10/1995 | Berkowitz ............................ | 428/546 |

FOREIGN PATENT DOCUMENTS 63-177459 * 7/1988 (JP).
4-94584 * 3/1992 (JP).

OTHER PUBLICATIONS

J.K. Furdyna et al., "Static magnetic susceptibility of ZnMnSe," Physical Review B, vol. 37, No. 7, pp. 3707–3709, Mar. 1988.*
N.W.Ashcroft et al., "Solid State Physics," Saunders College, p. 697, 1976.*
Berkowitz, A. E., et al., "Giant Magnetoresistance in Heterogeneous Cu–Co Alloys", *Phys. Rev. Lett.,* 68:3745 (1992).
*Binary Alloy Phase Diagram,* 2nd Ed., edited by Massalski, T.B., et al., (American Society for Metals, Metals Park, OH), 1:293 and references therein (1990).
*Handbook of Ion Implantation Technology,* J.F. Ziegler, ed., North–Holland Publishing, Amsterdam (1992).
Ion Implanation: Science and Technology, J.F. Ziegler, ed., Academic Press, Orlando (1984).
Kikkawa, J.M., et al., "Optical studies of locally implanted magnetic ions in GaAs", *Phys. Rev. B,* 50(3):2003 (1994).
Parkin, S. S. P., et al., "Oscillatory Magnetic Exchange Coupling through Thin Copper Layers", *Phys. Rev. Lett.,* 66:2152 (1991).
Prinz, G., "Hybrid Ferromagnetic–Semiconductor Structures", *Science,* 250:1092 (1990).
Tanaka, M., et al., "Epitaxial MnGa/NiGa magnetic multilayers on GaAs", *Appl. Phys. Lett.,* 63:696 (1993).
Tsuboya, I., et al., "Magnetic Properties of ζPhase in Mn–Ga System", *Phys. Soc. Jpn.,* 18:1096 (1993).
Xiao, J. Q., et al., "Giant Magnetoresistance in Nonmultilayer Systems", *Phys. Rev. Lett.,* 68:3749–3752 (1992).

\* cited by examiner

*Primary Examiner*—Sara Crane
(74) *Attorney, Agent, or Firm*—Fulbright & Jaworski L.L.P.

(57) ABSTRACT

Submicron ferromagnets, of selected size and spacing, are introduced into semiconductor by means of ion implantation and subsequent heat treatments. The resulting semiconductor contains ferromagnets at high density and which exhibit Curie temperatures exceeding room temperature. The semiconductor retains its intrinsic physical properties, such as optical and transport properties, after incorporation of the ferromagnetic nanostructures.

26 Claims, 4 Drawing Sheets

FIG. 1A
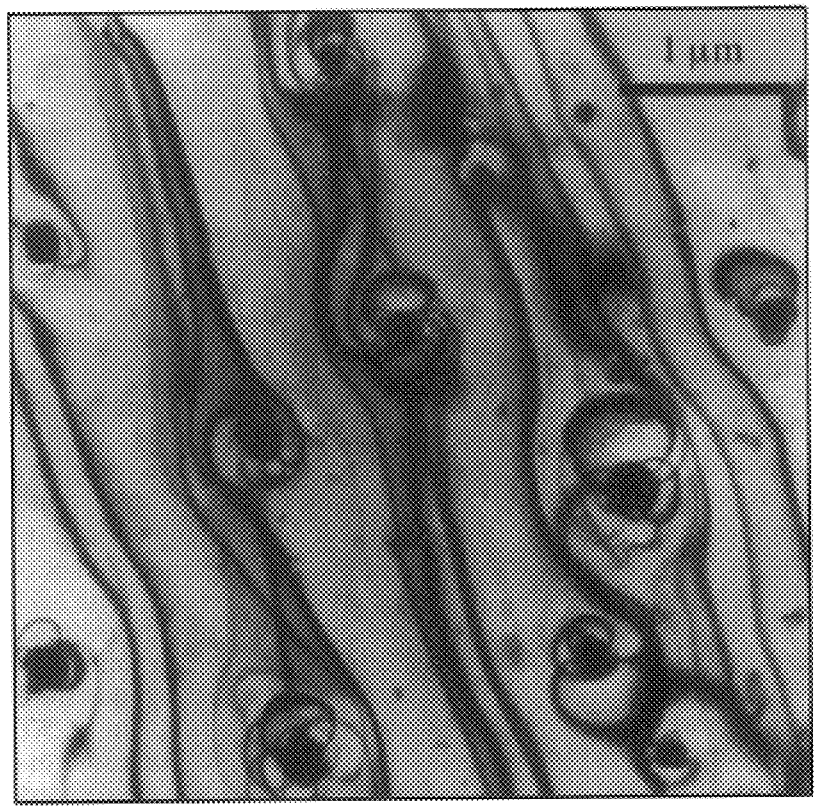
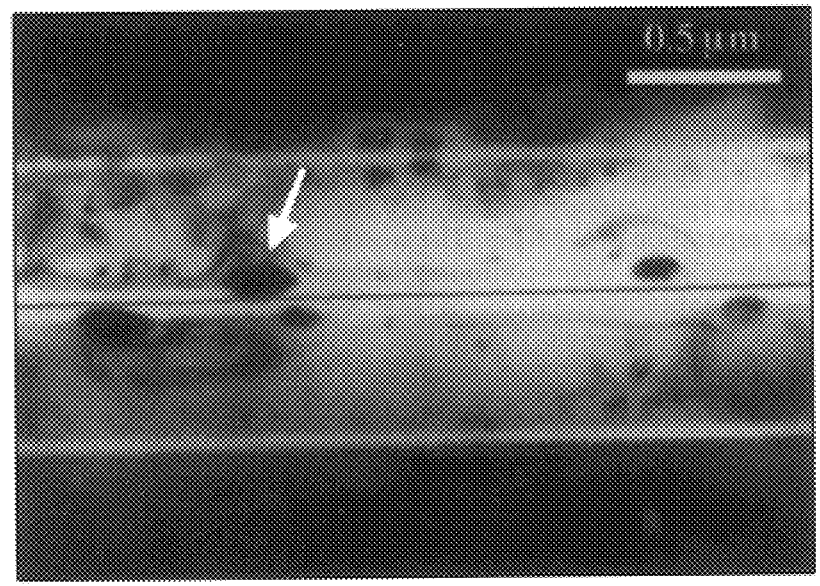
FIG. 1B

FIG. 2A
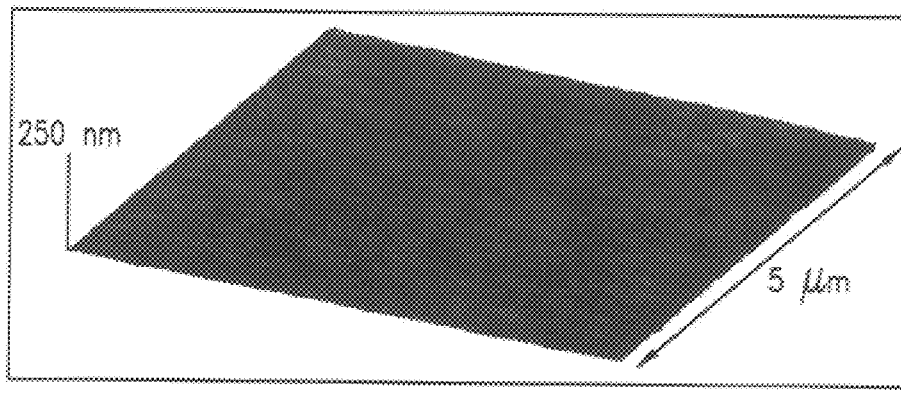
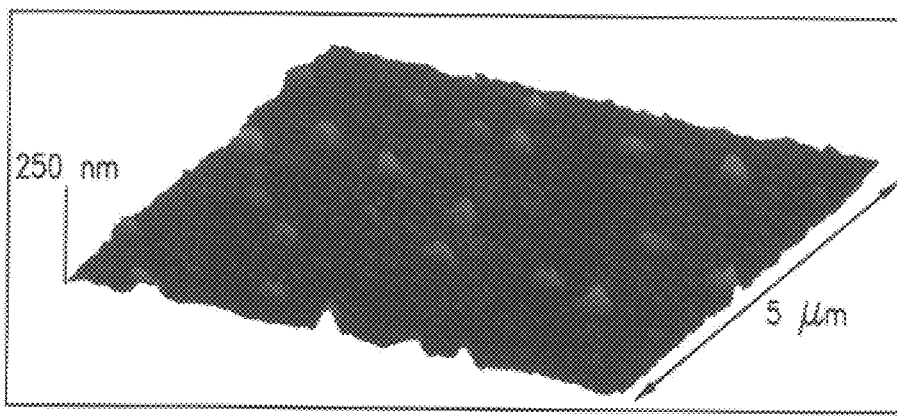
FIG. 2B
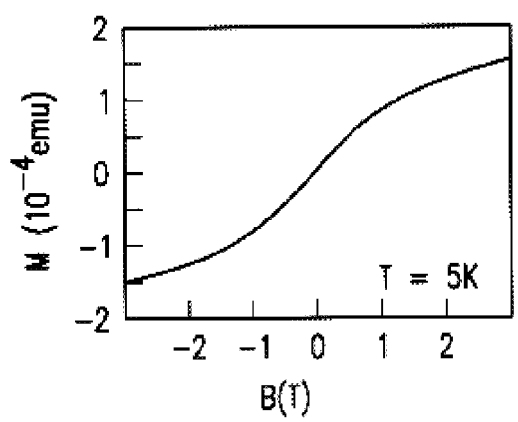
FIG. 2C
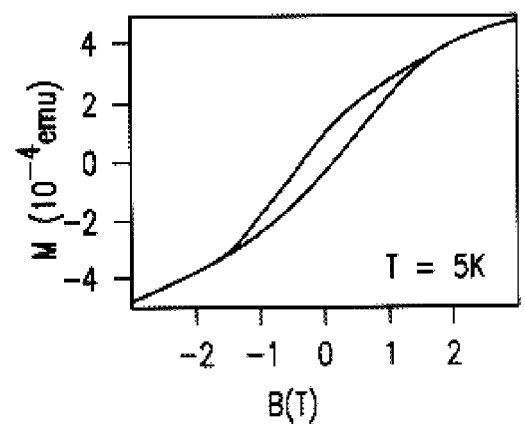
FIG. 2D

← 8 μm →

INTEGRABLE FERROMAGNETS FOR HIGH DENSITY STORAGE

This invention was made with Government support under Grant Nos. DMR-9123048 and DMR-9120007, awarded by the National Science Foundation. The Government has certain rights in this invention.

TECHNICAL FIELD OF THE INVENTION

This invention is in the field of electronic and photonic circuitries. In particular, this invention relates to the implantation of submicron ferromagnetic precursors into semiconductors, to produce semiconductors with ferromagnetic activity.

BACKGROUND OF THE INVENTION

The discovery of spin-dependent electronic phenomena occurring in magnetic multilayers {Parkin, S. S. P., et al., Phys. Rev. Lett., 66:2152–2155 (1991)} and granular solids {Xiao, J. Q., et al., Phys. Rev. Lett., 68:3749–3752 (1992); Berkowitz, A. E., et al., Phys. Rev. Lett., 68: 3745–3748 (1992)} is raising interesting scientific questions regarding spin interactions in reduced dimensional magnetic systems and giving rise to new device technologies. In particular, exploring magneto-electronic or -optical behavior within semiconducting compounds offers the exciting possibility of combining local magnetism with the flexibility of semiconductor-based quantum electronic structures {Prinz, G., Science, 250:1092–1097 (1990)}. Recent attempts at including ferromagnetism in III-V semiconductors required atomically layered deposition under precise epitaxial growth conditions, yielding two-dimensional magnetic thin films. {Tanaka, M., et al., Appl. Phys. Lett., 63:696–698 (1993)}.

SUMMARY OF THE INVENTION

One aspect of the invention presents a method for introducing ferromagnetic precursors into a substrate, preferably a semiconductor, which preferably allows the resulting product to behave as ferromagnets at room temperature. The ferromagnets are introduced into the substrate by means of ion implantation of the ferromagnetic precursors and subsequent annealing into ferromagnets. The method preferably preserves the integrity of the semiconductor, i.e. both the optical and current transport properties in the vicinity of the ferromagnets in the resulting product are the same, substantially the same, or similar, to the semiconductor substrate.

Another aspect of the invention presents materials which have ferromagnets incorporated onto, into and/or below their surfaces (herein collectively referred to as "integrated" into the product). The materials preferably possess Curie temperature above 400 K. These materials are preferably semiconductors, with ferromagnets integrated therein. More preferably, the semiconductors, with the integrated ferromagnets, bear electronic and photonic circuitries and can serve as an integrated unit for both disk and memory storage. The materials of this invention possess higher density of information storage than the currently available semiconductors. They are preferably made according to the method described in the preceding paragraph.

Another aspect of the invention presents devices made from or containing components comprising the above described materials.

BRIEF DESCRIPTION OF THE DRAWINGS

FIG. 1(a) is a plan-view TEM micrograph for a $1 \times 10^{16}$ $Mn^+/cm^2$ GaAs sample implanted at 200 keV and annealed at 920° C. for 60 sec. The dark areas are GaMn precipitates.

FIG. 1(b) is a cross-sectional TEM micrograph of a split $5 \times 10^{16}$ $Mn^+/cm^2$ GaAs sample annealed at 920° C. for 60 sec. Two cross-sections are shown with the boundary between surfaces marked by a solid line. An arrow points to one ferromagnetic precipitate.

FIG. 2 are AFM images of a $5 \times 10^{16}$ $Mn^+/cm^2$ GaAs (a) unannealed and (b) annealed at 920° C. for 60 sec. Paramagnetic magnetization for the unannealed sample appears in (c), while the paramagnetic and ferromagnetic contributions for the annealed sample are shown in (d).

DETAILED DESCRIPTION OF THE INVENTION

Figure 3A:
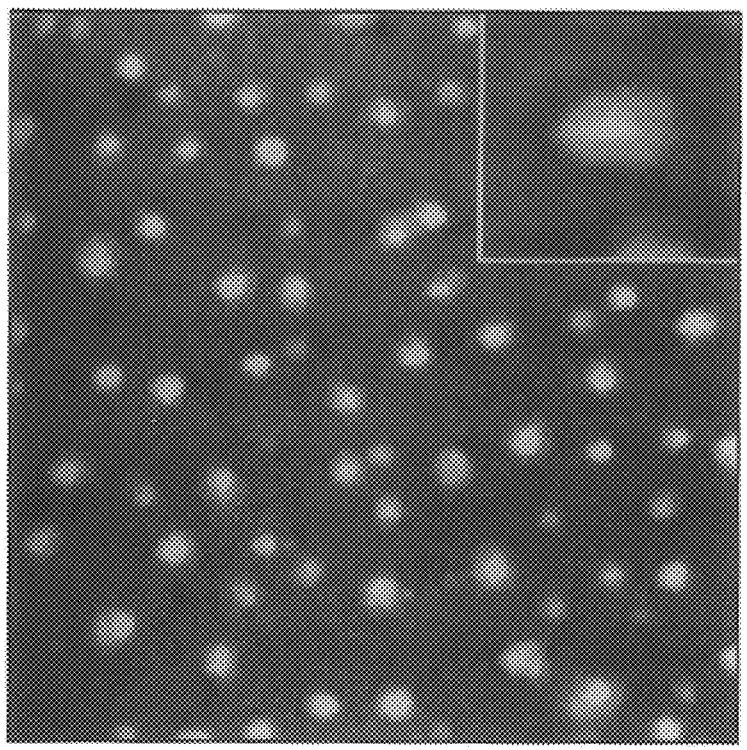
FIG. 3 is a zero field topographic (a) and magnetic force (b) images of the same area taken on an unmagnetized $5 \times 10^{16}$ $Mn^+/cm^2$ GaAs sample annealed at 920° C. for 60 sec. The insets show enlarged structural and magnetic images of a single precipitate.

Abbreviations used in this application are as follow:

AFM—Atomic Force Microscopy
2DEG–2 Dimensional Electron Gas
FIB—Focused Ion Beam
LMIS—Liquid-Metal-Ion Source
MBE—Molecular Beam Epitaxy
MFM—Magnetic Force Microscopy
RF—Radio Frequency
RTA—Rapid Thermal Annealing
SQUID—Superconducting Quantum Interference Device
TEM—Transmission Electron Microscopy
UHV—Ultra High Vacuum The abbreviations for the chemical elements are those used for the Periodic Table.

It is well known that the application of magnetic fields to semiconducting substrates can produce significant changes in the electrical and optical properties. However, even though magnetic fields are widely used for studying semiconductors, they are seldom used in device application because of the difficulty of generating local magnetic fields in device configurations. By generating local magnetic fields, the material of the present invention allows for its use in device configuration.

As far as the applicants are aware, the present invention also presents the first demonstration of an optically active semiconductor containing nanostructure ferromagnets which exhibit room temperature ferromagnetism. These ferromagnets are introduced into a semiconductor by ion implantation. In particular, the present invention presents the first instance in which ion implantation techniques were used for implanting ferromagnets into semiconductors. These ferromagnets remain ferromagnetic in the material of the present invention over a wide range of temperature, and possess Curie temperature above 400 K, and preferably, at between about 400 K to about 700 K. The following describes the different aspects of the invention in more detail.

One aspect of the invention presents a method for introducing ferromagnetic precursors into a substrate which preferably allows the resulting product to behave as ferromagnets at room temperature. The substrate is preferably a semiconductor, examples of which include an epitaxial film of semiconductor, and a semiconductor bearing photonic or electronic circuitries wherein the ferromagnets electrically or magnetically interact with the circuitries. The resulting product preferably behaves as ultrasmall ferromagnets at room temperature. The ferromagnets are introduced into the substrate by means of ion implantation of the ferromagnetic precursors and subsequent annealing into ferromagnets. In the fabrication of ultrasmall ferromagnets, the preferred embodiment of the present invention has the advantage of preserving the integrity of the semiconductor, i.e. both the optical and current transport properties in the vicinity of the ferromagnets in the resulting product are the same as, substantially the same as, or similar to the semiconductor substrate.

Another aspect of the invention presents materials which have ferromagnets incorporated (a) within a region of the material on and integral with another region of their material, (b) into the material, and/or (c) below the surface of the material (herein collectively referred to as "integrated" into the material). These materials are preferably the resulting products made according to the method described in the preceding paragraph. The materials are ferromagnets, and are preferably ferromagnets at room temperature, and possess (a) Curie temperature above about 400 K, preferably their Curie temperature falls within the range of about 400–700 K; and more preferably, within the range of about 475 K to 550 K.

More preferably, the ferromagnets are of selected size and spacing, and may be arranged, e.g. on the surface of the material, at a predetermined pattern. Preferably, the ferromagnets range from nm to $\mu$m. Further, the luminescence polarizations of the materials are preferably between 50% to 80% at between 0 T to 8 T. The crystals of ferromagnets in the materials can be of small sizes, such as between 10 and 500 nm. The preferred materials contain one or more, and preferably all the foregoing properties. These materials are preferably electronic and photonic circuitries, in particular semiconductors bearing such circuitries, into which the ferromagnets have been integrated. The ferromagnets can be arranged on a thin sheet of films such as circuitries, of between 10 to 500 nm, and can thus be arranged many layers together and used for high density storage, especially high packing density in electronics. Each of these circuitries is especially advantageous as an integrated unit for both disk and memory storage.

By integrating ferromagnets into semiconductors, the present invention allows for disk and memory storage on the same product. This is an advance over current electronics, in which magnetic tapes serve as disk storage, and semiconductors serve as memory storage. The storage system of the present invention is highly integrable with other semiconductor quantum electronics, because the electronic properties of the semiconductor are preserved by the processing.

The density of information storage of the materials of this invention is higher than the currently available semiconductors. The density of information storage in currently available semiconductors generally range from $10^2$ to $10^8$ cm$^{-2}$ density. In the present invention, depending on the implanted ion species and the substrate used, the density of information storage can easily be higher than this general range, for example, it can be between about $10^{14}$ to $10^{17}$ cm$^{-2}$ ferromagnets, e.g., in a circuitry.

The method of the present invention has many other advantages over the current art. It requires less processing due to its fewer fabrication steps, and is thus economical though it results in more information storage media, less error, and less media noise in the storage systems. Moreover, the material of this invention is optically active and has a unique advantage for data retrieval and manipulation. The invention thus provides a basis for the next generation of information storage systems which are economical, of high quality, with high areal density, integrable with other semiconductor electronics, and optically active. As the areal density approaches and exceeds 10 Gb/in$^2$, each information bit is stored in a space which is less than 1 $\mu$m in linear dimension.

The preferred fabrication method induces the formation of ferromagnetic clusters in the resulting product. The resulting product preferably has clusters or crystal precipitates of ferromagnets on its surface and more preferably, at its epitaxial layer. The crystals can be generated in small sizes, such as between 10 and 500 nm, the spacing among these precipitates can be tuned by varying the implantation dosage and annealing conditions, such as under the conditions described in the following "EXAMPLE" section. Ion implantation techniques known in the art can be used, examples of which are described in *Handbook of Ion Implantation Technology*, J. F. Ziegler, ed., North Holland Publishing, Amsterdam (1992); and *Ion Implantation: Science and Technology*, J. F. Ziegler, ed., Academic Press, Orlando (1984). Generally, the annealing temperature falls within the range of about 600 to 1200° C., and more preferably within the range of about 800 to 1200° C.; and the annealing time falls within the range of about 1 second to 1 hour. Preferably, the annealing is performed in an inert forming gas of 90±5% $N_2$, 10±5% $H_2$, between about 800–1200° C. (depending on the materials used) for a period of time sufficient to anneal out the ion implantation damage and allow for the precipitation and formation of ferromagnets. The annealing is preferably by RTA. The annealing is preferably conducted under a GaAs or Si which prevents contamination of the annealed surface. In situ annealing is preferred, though not necessary, because it produces a less contaminated product. Depending on the ion species and substrate used, the ferromagnet precursors may generally be implanted at an energy ranging from about 25 to 400 keV.

The method of the present invention can also be extended to include FIB implantation for spatially patterning these ferromagnets, e.g. using the method described in Kikkawa, J. M., et al., *Phy. Rev.* B, 50(3): 2003–2006 (1994)}. Kikkawa, J. M., et al. found that FIB resolutions of ~100 nm allowed direct submicrometer patterning of magnetic properties which could be done in conjunction with MBE growth of quantum structures.

Additionally, optical activities, including photoluminescence and magneto-optical Kerr effect, can be achieved by lower temperature and longer annealing time. The appropriate temperature and annealing time can be determined, e.g. experimentally by performing experiments similar to those described in the "EXAMPLE" section, below.

Examples of ferromagnetic precursors are ions of rare earth metals and transition metals. The preferred rare earth metals are Dy and Gd. The preferred transition metals are Ni, Fe, Co, and Mn. In the preferred embodiment of the invention, the choice of the ion species is determined by the requirement that the semiconductor retains good optical and/or electrical transport properties after the fabrication of the ferromagnetic nanostructures. In the following EXAMPLE, Mn ions are introduced into GaAs semiconductors using the ion implantation and subsequent annealing. Other ferromagnetic precursors can be introduced into the semiconductors in similar manner. The method of fabrication is general and may be applied to other ferromagnetic precursors. It relies on the formation of a non-equilibrium ferromagnetic phase, within the semiconductor, through ion implantation. The non-equilibrium phase is formed during the annealing step and is stable at a temperature between 40 K and 1,000 K.

The semiconductors can be any known in the art, such as Group IV elemental and alloy compounds, Group III-V compounds and Group II-VI compounds. Examples of semiconductors are: Ge, GaAs, ZnSe, and Si. GaAs is a III-V compound, and ZnSe is a II-VI compound. With the different substrates and ferromagnetic precursors, the implantation dosage and annealing temperature are adjusted accordingly, e.g. by experimentally determination, such as performing experiments similar to those described in the "EXAMPLE" section, below. Further, the spacing among the ferromagnetic precipitates can be tuned by varying the implantation dosage and annealing conditions. As shown in the following EXAMPLE, the precipitates of GaMn-rich crystals were formed, and the average size was about 200 nm. For the GaAs receiving $5 \times 10^{16}$ Mn ions/cm$^2$ and annealed at 920° C. for 1 minute, the spacing is about 1 $\mu$m (FIG. 2). These precipitates were room temperature ferromagnets, and the Curie temperature was well above 400 K.

Using the present method, submicron GaMn-rich ferromagnets have been fabricated on semiconductor GaAs substrates. In the case of Mn implanted onto semiconductor GaAs substrates, the GaAs receives $5 \times 10^{16}$ Mn ions/cm$^2$, when annealed at 920° C. for 1 minute. The areal density approaches and exceeds 10 Gb/in$^2$, each information bit is stored in a space which is less than 1 $\mu$m in the linear dimension. An increase in the implantation dose to $10^{16}$ cm$^{-2}$ coupled with longer anneal times favor the formation of GaMn clusters.

In order to place a magnetic layer near a 2 Dimensional Electron Gas (2DEG) (within 50 nmn), the Mn ions are first implanted in an epitaxial layer and then transferred via an UHV shuttle to an MBE chamber for in situ annealing to repair lattice damage followed by regrowth to form the heterojunction. In situ annealing is preferred, though not necessary, because it produces an impurity free processing. Preferably, to reduce lattice damage and improve optical quality, RTA is performed in an inert forming gas of 90% $N_2$ and 10% $H_2$, between about 800–920° C., for durations ranging from 5 sec to 20 min, under a GaAs cover.

The compatibility of the material of the present invention with semiconductor processing methods offers unprecedented opportunities for magnetic storage technologies. The material of this invention can serve as microscopic Hall bar sensors (no external magnetic field required), magnetoresistive recording read/write heads, single domain head for magnetic force microscopy, and magneto-optical memory media. Other uses of the material include: thin film magnetic memory, nonvolatile memory element with semiconductor readout, or ferromagnetic metal films serving as a source of spin-polarized carriers for use as an electrical contact on a nonmagnetic metal or semiconductor and spin polarized field effect transistor as described in Prinz, G., Science, 250:1092–1097 (1990))(hereby incorporated by reference in its entirety). Alternatively, the process of this invention can be used to produce ferromagnetic metal films on semiconductors to be used for the purpose described in Prinz, G., Science, 250:1092–1097 (1990). Further, for example, the present invention can be used in the device described in Prinz, G., above, to produce: nonvolatile memory element with semiconductor readout; medium to low frequency planar device applications; high frequency device applications in which the product of the present invention is coupled to a radiation field; and devices which distinguish spin-up and spin-down carriers which add another dimension of device parameters space, which has not been exploited before.

An example of a magnetic memory element is a thin-film analog of a ferrite core. The element is produced by the method of this invention, resulting in a deposit of ferromagnets on a semiconductor substrate, such as Mn ions implanted and annealed onto GaAs, resulting in MnAs or MnGa ferromagnetic clusters or precipitates on the epitaxial layer of the GaAs semiconductor. Most of the film is lithographically removed except for a square "picture frame" structure which is oriented to have its legs parallel to the underlying GaAs layer (See e.g. FIG. 4 of Prinz, G., above). These structure has only two stable magnetic orientations: it may be magnetized either clockwise or counterclockwise. These two states represent either a "0 " or "1 " bit, respectively. In order to read which bit is set, a small gap is opened in the magnetic circuit (See e.g. FIG. 4 of Prinz, G., above) and a material is deposited within the gap that exhibits a large Hall effect. By maintaining a current through the Hall bar, a voltage is generated between its upper and lower surfaces, whose polarity reveals the magnetic state of the magnetic circuit. Finally, if the GaAs substrate was prepared, before the deposition of the magnetic and Hall elements, with a source, drain, and channel that lie beneath the Hall bar, then the charge generated on the lower face of the Hall bar can be utilized to bias the field effect transistor (FET) channel beneath it, Thus, in a single compact unit, one has a nonvolatile memory element with a semiconductor readout.

Another example of the uses of the present invention is in a thin-film magnetic memory element. This application is based on a closed magnetic circuit concept, which is achieved not through lithography, but through a sandwich structure. This structure can have four stable magnetic states (See e.g. FIG. 5 of Prinz, G., above). To achieve the first two magnetic states, two layers of the ferromagnetic film of the present invention are aligned so that the structure has a net magnetic moment, whereas in the latter they are anti-aligned, forming a closed circuit with no external moment. The other two states are obtained by reversing all of the moments (See e.g. FIGS. 2 and 5 of Prinz, G., above). These are four stable states in zero applied field, not simply a two saturated states. The two films have different anisotropies because they do not have identical interfaces. This can be achieved by ion implantation and annealing of Mn ions on GaAs on one film; and ion implantation and annealing of Fe ions on Ag on the other film, both using the method of the present invention. The films reverse at different applied fields, and this effect overwhelms the magnetostatic energy contribution. One may alter the value of these coercive fields at which switching occurs by changing the film thickness and growth condition. In the absence of anisotropy, the only remaining energy would be the magnetostatic contribution (there is no coupling through the Ag film). Thus, there are only two stable states, with M=0. Such a structure can be used in a thin-film magnetic memory element. The bits are set by current pulses but the readout is via the magnetoresistance of the films themselves. Although ferromagnetic coupling through the intervening layer could prevent the M=0 state from being formed, an antiferromagnetic coupling would stabilize it, e.g. by replacing Ag intervening layer with a very thin Cr layer.

The ferromagnetic films of the present invention may also be used as a source of spin-polarized carriers, by serving as an electrical contact on a semiconductor. These carriers can be made and used in devices in similar manner as described in Prinz, G., above.

Having described the invention generally, the following EXAMPLE specifically presents one embodiment of the invention. The following example is presented to illustrate some aspects of the invention, and is not to be construed as limiting the scope of the invention.

EXAMPLE

The semiconductor samples were grown by MBE on semi-insulating GaAs substrates and consisted of 500 nm undoped GaAs epilayers grown atop 50 nm AlAs and a 500 nm GaAs buffer. These structures were subsequently implanted with $Mn^+$ ions at energies of 50 and 200 keV and doses ranging from $1\times10^{14}$ to $5\times10^{16}$ $Mn^+/cm^2$. In order to magnetically activate the implanted ions, the samples were covered with Si substrates and annealed in a forming gas (90% $N_2$, 10% $H_2$) at temperatures from 800° C. to 920° C. for durations ranging from 5 sec to 20 min. Both the annealed and unannealed samples were thinned for TEM study. Electron microdiffraction and energy dispersive X-ray techniques are also employed for structural and compositional analysis. To reduce the diamagnetic background in the magnetization measurements, the 500 nm thick implanted surface layer was removed by etching the thin AlAs layer in diluted hydrochloride solution. Magnetization measurements of the resulting films were obtained from a RF SQUID magnetometer in fields up to 5T and temperatures ranging from 5 to 300 K. AFM and room-temperature MFM were employed to spatially probe both the topography of the sample surfaces as well as the local magnetic fields generated by the submicron magnetic structures.

The plan-view TEM seen in FIG. 1(a) reveals a striking phase separation in the $Mn^+$-implanted and annealed GaAs samples which was absent in unannealed materials. The precipitates are typically 200 nm in diameter with an average separation of ~1.5 micron. Quantitative analysis of the energy dispersive X-ray spectra obtained from single precipitates in these structures indicated that they contained approximately 60% Ga and 40% Mn. In FIG. 1 (b), a cross-sectional TEM micrograph of a sample implanted with $5\times10^{16}$ $Mn^+/cm^2$ reveals that virtually all of the precipitates pierced the implanted surface. This may arise from either interfacing strain with the surrounding GaAs or point defects within the material, and allows monitoring of precipitate formation by AFM. Moreover, crystallinity was locally probed by electron micro-diffraction, and for some precipitates a ten-fold symmetry was observed which suggested quasi-crystallinity.

To correlate precipitate formation with magnetic properties, both unannealed and annealed samples were studied using AFM and SQUID measurements. In the unannealed control sample receiving $5\times10^{16}$ $Mn^+/cm^2$, the AFM data of FIG. 2(a) and cross-sectional TEM studies indicate no precipitate formation. As seen in FIG. 2(c), the SQUID magnetometry at T=5K shows that the implanted $Mn^+$respond paramagnetically as expected from independent spins. Subsequent annealing at 920° C. for 60 sec produced dramatic changes in both the structural and magnetic properties of the sample. AFM images revealed the appearance of precipitates shown in FIG. 2(b), and the resulting magnetization contained a clear hysteresis loop superimposed on a paramagnetic background (FIG. 2(d)). Comparison of the saturated ferromagnetic and paramagnetic moments indicated that 13% of the magnetically active $Mn^+$ions are incorporated within the ferromagnetic particles.

Moreover, this ferromagnetism persisted to room temperature, enabling submicron magnetic imaging by room-temperature MFM.

Figure 3B:
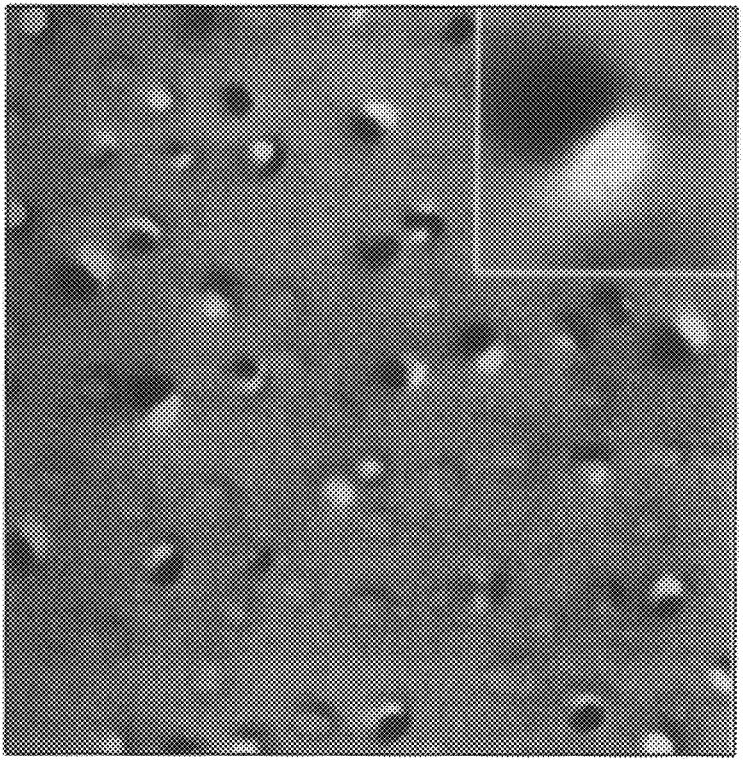

MFM measurements confirmed that the ferromagnetism originated from the GaMn crystallites. For an unannealed sample receiving $5\times10^{16}$ $Mn^+/cm^2$, comparison of the structural response seen in the topographic image of FIG. 3(a) and the simultaneous magnetic response appearing in FIG. 3(b) revealed a one-to-one correspondence between crystallites and the magnetic response of the MFM tip. While most of the GaMn crystallites appeared to be magnetic, they exhibited a variety of magnetic orientations and states. At this dosage, approximately 50% of the structures were clearly ferromagnetic; at a lower dosage of $1\times10^{15}$ $Mn^+/cm^2$ the ratio increased to 70%. Since the magnetic image contrast resulted from repulsive and attractive forces between the MFM tip and the crystallite, light and dark regions arose from oppositely oriented field gradients and corresponded to opposite magnetic poles. The sample represented in FIG. 3 rested in zero applied field and the precipitates generally appeared to be dipolar with random orientations. A typical in-plane dipole is seen in the inset of FIG. 3.

Figure 4A:
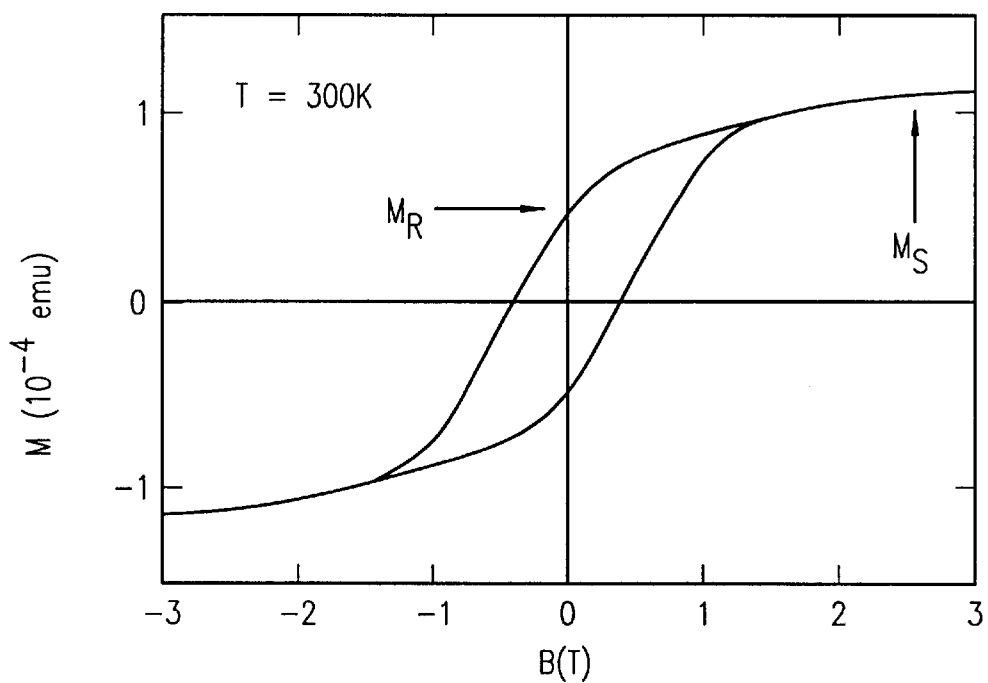
FIG. 4(a) SQUID data of a $5 \times 10^{16}$ $Mn^+/cm^2$ GaAs sample annealed at 920° C. for 60 sec. The temperature is 300K and the diamagnetic background is removed. $M_R$ is the remanent moment at zero magnetic field and $M_S$ is the magnetization at B=2.5T, equal to the saturation moment of the ferromagnetic component at T=300 K, where paramagnetic contributions are small.
Figure 4B:
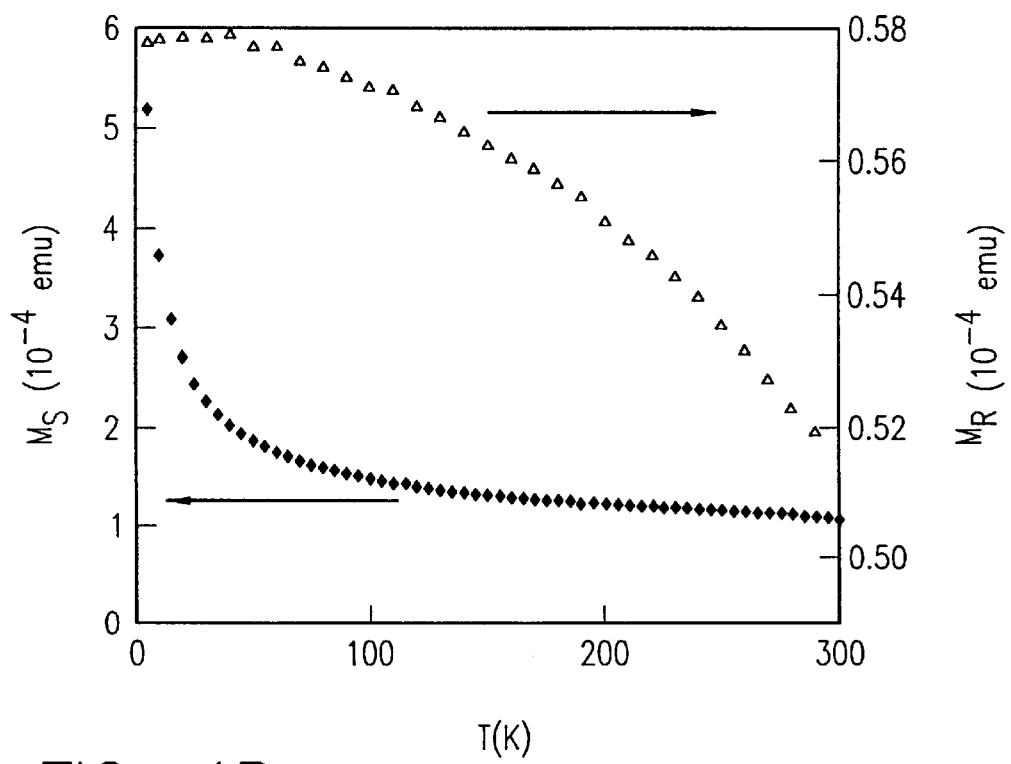
FIG. 4(b) is a plot of the dependence of $M_R$ and $M_S$.

Direct SQUID magnetization measurements of these materials revealed that the GaMn crystallites were robust ferromagnets. FIG. 4(a) shows that strong magnetic hysteresis behavior exists at T=300K. The coercive field, $H_c$, (~0.5T) changed little over the entire temperature range (5K–300K). In addition, the remanent magnetization shown in FIG. 4(b) dropped only 15% from 5K to 295K, implying a Curie temperature, far exceeding room temperature and the Curie temperatures of other known GaMn {Tsuboya, I., et al., *Phys. Soc. Jpn.*, 18:1096 (1993) and Wachtel, E., et al., *Metallkd.*, 56:779 (1965)} or MnAs {*Binary Alloy Phase Diagram*, 2nd Ed., edited by Massalski, T. B., et al. (American Society for Metals, Metals Park, OH), 1:295 and references therein (1990)} compounds. For comparison, FIG. 4(b) demonstrates that most of the temperature-dependent magnetization arose from the paramagnetic contribution.

Varying implantation dose and energy can affect precipitation by controlling the density of both Mn ions and lattice defects. Though a reduction of defects should lower Mn diffusion, applicants find that reducing the dose fifty times ($5\times10^{16}$ to $1\times10^{15}$ $Mn^+/cm^2$) at a fixed annealing condition of 920° C. for 60 sec resulted in increased precipitation per ion. As seen through AFM, the particle diameter, d, more than doubled from ~181 nm to ~400 nm, whereas precipitate densities only decreased to 1/5 their value ($1.5\times10^8$ $cm^{-2}$ to $2.8\times10^7$ $cm^{-2}$). Furthermore, the fractional size variation, $\Delta d/d$, decreased from 0.91 to 0.71. Magnetic measurements reflect these structural changes, where enhanced precipitation gave rise to nearly the same total magnetization with lower dosage. Moreover, $H_c$ dropped from 0.5T to 0.1 T while the magnetization slope at $H_c$ doubled, reflecting increased particle sizes and uniformities, respectively. Within the parameters studied, these magnetic properties were insensitive to the implantation energy and annealing conditions.

The implantation and annealing conditions may be varied and their effects on the size, shape, crystallinity and magnetism of these precipitates studied to allow one to tailor the precipitates' individual magnetic properties and control their spatial distributions. In addition, a focused ion beam, previously used to locally implant Mn ions {Kikkawa, J. M., et al., *Phys, Rev. Rapid Communications*, B50:2003–2006 (1994)}, can be employed to pattern ferromagnetic particles within semiconductor electronics. These techniques offer the possibilities for integrating a variety of submicron ferromagnetic structures within III-V semiconductors and enabling spin-dependent electronics.

All publications and patent applications mentioned in this Specification are herein incorporated by reference to the same extent as if each of them had been individually indicated to be incorporated by reference.

Although the foregoing invention has been described in some detail by way of illustration and example for purposes of clarity and understanding, it will be obvious that various modifications and changes which are within the skill of those skilled in the art are considered to fall within the scope of the appended claims. Future technological advancements which allows for obvious changes in the basic invention herein are also within the claims.

We claim:

1. A material comprising a substrate with one or more ferromagnets integrated into it by ion implantation and annealing of a precursor thereto, wherein said ferromagnets are at a density of at least $10^{14}$ cm$^{-2}$ in the substrate, have a Curie temperature above about 400 K, and are ferromagnetic at room temperature.

2. The material of claim 1, wherein said ferromagnets have a Curie temperature falling within the range of about 400 to 700 K.

3. The material of claim 1, wherein the substrate is a semiconductor.

4. The material of claim 3, wherein the semiconductor bears a photonic or electronic circuitry and the ferromagnets electrically or magnetically interact with the circuitry.

5. The material of claim 3, wherein:
the semiconductor is selected from the group consisting of: Group IV elemental and alloy compounds, Group III-V compounds, and Group II-VI compounds.

6. The material of claim 3, wherein the ferromagnets comprise ions of rare earth or transition metals.

7. The material of claim 6, wherein the semiconductors are selected from the group consisting of: Group IV elemental and alloy compounds, Group III-V compounds, and Group II-VI compounds.

8. The material of claim 6, wherein the rare earth metals are Dy or Gd; and the transition metals are selected from the group consisting of: Ni, Fe, Co, and Mn.

9. The material of claim 7, wherein the rare earth metals are Dy or Gd; and the transition metals are selected from the group consisting of: Ni, Fe, Co, and Mn.

10. The material of claim 9, wherein the semiconductor is selected from the group consisting of: Ge, GaAs, ZnSe, and Si.

11. The material of claim 10, wherein the ferromagnets are magnetic at room temperature.

12. The material of claim 11, wherein the ferromagnets range from 10 nm to 500 nm in size.

13. The material of claim 12, wherein the substrate is between 10 to 500 nm in thickness.

14. The material of claim 13, wherein the substrate bears a photonic or electronic circuitry and the ferromagnets electrically or magnetically interact with the circuitry.

15. The material of claim 14, wherein the ferromagnets are at a density of between $10^2$ and $10^{17}$ cm$^{-2}$ in the substrate.

16. The material of claim 15, wherein the material has a luminescence polarization of between about 50% to about 80% at between about 0 T to about 8 T.

17. A material comprising a semiconductor with one or more ferromagnets integrated into it by ion implantation and annealing of a precursor thereto,
wherein the resulting semiconductor remains optically active; and
wherein said ferromagnets are at a density of at least $10^{14}$ cm$^{-2}$ in the semiconductor, and are ferromagnetic at room temperature with a Curie temperature between about 400 to 700 K.

18. A product produced by a process comprising the steps of:
a) implanting ferromagnet precursors into a substrate at a density of at feast $10^{14}$ cm$^{-2}$ in the substrate, by ion implantation with the aim of producing ferromagnets; and
b) annealing the substrate to generate ferromagnets therein, said ferromagnets possessing ferromagnetic properties at room temperature and having a Curie temperature above about 400 K.

19. The product of claim 18, wherein the substrate is a semiconductor.

20. The product of claim 19, wherein said semiconductor bears a photonic or electronic circuitry and the ferromagnets electrically or magnetically interact with the circuitry.

21. A device containing a material comprising a semiconductor with one or more ferromagnets integrated into it by ion implantation and annealing of a precursor thereto,
wherein said ferromagnets are at a density of at least $10^{14}$ cm$^{-2}$ in the substrate, have a Curie temperature between about 400 K to 700 K and are ferromagnetic at room temperature; and
wherein said material retains the same, substantially the same or similar optical and/or electrical transport properties of the semiconductor before the integration of the ferromagnets into the semiconductor.

22. An optically active semiconductor containing ferromagnets between 10 nm to 50 nm in size which exhibit room temperature ferromagnetism.

23. A material comprising a semiconductor with one or more ferromagnets integrated into it by ion implantation and annealing of a precursor thereto, said ferromagnets having no substantial effect on the current transport properties of said semiconductor; and
wherein said ferromagnets are at a density of at least $10^{14}$ cm$^{-2}$ in the substrate, are ferromagnetic at room temperature and have a Curie temperature between about 400 K to 700 K.

24. The product of claim 19, wherein the semiconductor is selected from the group consisting of: Group IV elemental and alloy compounds, and Group III-V compounds.

25. The product of claim 24, wherein said semiconductor bears a photonic or electronic circuitry and the ferromagnets electrically or magnetically interact with the circuitry.

26. The product of claim 5, wherein the semiconductor is selected from the group consisting of: Group IV elemental and alloy compounds, and Group III-V compounds.

* * * * *